(12) United States Patent
Joshi

(10) Patent No.: US 11,391,587 B1
(45) Date of Patent: Jul. 19, 2022

(54) ASSESSING THE IMPACT OF BLOCKAGES ON AUTONOMOUS VEHICLE SERVICES

(71) Applicant: Waymo LLC, Mountain View, CA (US)

(72) Inventor: Ajay Joshi, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 620 days.

(21) Appl. No.: 16/393,567

(22) Filed: Apr. 24, 2019

(51) Int. Cl.
   *G01C 21/34* (2006.01)
   *G08G 1/00* (2006.01)
   *G05D 1/00* (2006.01)

(52) U.S. Cl.
   CPC ..... *G01C 21/3492* (2013.01); *G01C 21/3415* (2013.01); *G01C 21/3461* (2013.01); *G05D 1/0088* (2013.01); *G08G 1/207* (2013.01); *G05D 2201/0213* (2013.01)

(58) Field of Classification Search
   CPC ........................ G01C 21/3492; G01C 21/3415
   See application file for complete search history.

(56) References Cited

U.S. PATENT DOCUMENTS

| | | | |
|---|---|---|---|
| 8,706,394 | B2 | 4/2014 | Trepagnier et al. |
| 9,494,937 | B2 | 11/2016 | Siegel et al. |
| 2011/0098915 | A1 | 4/2011 | Disatnik et al. |
| 2014/0278052 | A1* | 9/2014 | Slavin ............... G08G 1/0129 701/400 |
| 2018/0004214 | A1* | 1/2018 | Wisniowski ..... G08G 1/096725 |

OTHER PUBLICATIONS

Behrisch, M. et al., SUMO-Simulation of Urban Mobility, Institute of Transportation Systems, 2011.

* cited by examiner

*Primary Examiner* — Elaine Gort
*Assistant Examiner* — Tarek Elarabi
(74) *Attorney, Agent, or Firm* — Botos Churchill IP Law

(57) ABSTRACT

The disclosure relates to assessing impact of blockages on an autonomous vehicle transportation service. An example method may include identifying a plurality of starting and destination location pairs within a service area; running a first plurality of simulations by determining a first route for each of the plurality of pairs without including a first blockage in the service area; determining a first summary for each determined first route identifying a length of time to complete that determined route; running a second plurality of simulations by determining a second route for each of the plurality of pairs and including the first blockage in the service area; determining a second summary for each determined second route identifying a length of time to complete that determined route; and comparing the determined first summaries with the determined second summaries in order to assess an impact of the first blockage on the service.

20 Claims, 12 Drawing Sheets

ASSESSING THE IMPACT OF BLOCKAGES ON AUTONOMOUS VEHICLE SERVICES

BACKGROUND

Autonomous vehicles, such as vehicles that do not require a human driver, can be used to aid in the transport of passengers or items from one location to another. Such vehicles may operate in a fully autonomous mode where users may provide some initial input, such as a pickup or destination location, and the vehicle maneuvers itself to that location. When a person (or user) wants to be physically transported and/or to transport goods between two locations via a vehicle, they may use any number of taxi or delivery services. To date, these services typically involve a human driver who is given dispatch instructions to a location to pick up and drop off the user and/or goods. In many instances, human drivers may tend to take the fastest or most direct route to the destination location. However, in the case of autonomous vehicles, where some areas may be "off-limits" for one reason or another, this may not always be possible.

BRIEF SUMMARY

One aspect of the disclosure provides a method of assessing impact of blockages on an autonomous vehicle transportation service. The method includes identifying, by one or more processors of a computing device, a plurality of starting and destination location pairs within a service area; running, by the one or more processors, a first plurality of simulations by determining a first route for each of the plurality of starting and destination location pairs without including a first blockage in the service area; determining, by the one or more processors, a first summary for each determined first route identifying a length of time to complete that determined route; running, by the one or more processors, a second plurality of simulations by determining a second route for each of the plurality of starting and destination location pairs and including the first blockage in the service area; determining, by the one or more processors, a second summary for each determined second route identifying a length of time to complete that determined route; and comparing, by the one or more processors, the determined first summaries with the determined second summaries in order to assess an impact of the first blockage on the service.

In one example, the first blockage corresponds to an area through which a vehicle of the autonomous vehicle transportation service is not permitted to drive by the service. In this example, the first blockage includes a timing component which identifies a particular period of time during which the blockage is effective. In another example, identifying the plurality of starting and destination location pairs includes selecting prior trips made using the service within a previous period of time. In another example, identifying the plurality of starting and destination location pairs includes selecting a starting location and a destination location from different prior trips made using the service within a previous period of time. In this example, the method also includes comprising assigning a time to the selected starting location and destination location corresponding to a high-volume traffic period. Alternatively, the method also includes assigning a time to the selected starting location and destination location corresponding to a low-volume traffic period. In another example, identifying the plurality of starting and destination location pairs includes using a fuzzing technique to select a fuzzed starting location and a fuzzed destination location using a prior starting and destination location pair. In another example, each starting and destination location pair of the plurality is associated with a time at which a corresponding route will start. In another example, each first summary for each determined first route includes a length of that first determined route, and each second summary for each determined second route includes a length of that second determined route. In another example, each first summary for each determined first route includes a number of a type of maneuver required by that first determined route, and each second summary for each determined second route includes a number of the type of maneuver required by that second determined route. In this example, the type of maneuver is an unprotected turn. Alternatively, the type of maneuver is a lane change. Alternatively, the type of maneuver is a blocking left turn. In another example, the comparing includes determining a difference between a number of a type of maneuver required by each of the determined first routes and a number of the type of maneuver required by each of the determined second routes. In another example, each first summary for each determined first route includes a forward progress metric identifying how often that determined first route progresses towards a destination location for that determined first route, and each second summary for each determined second route includes a forward progress metric identifying how often that determined second route progresses towards a destination location for that determined second route. In another example, running the first plurality of simulations includes a second blockage in the service area. In another example, the comparing includes determining a number of starting and destination location pairs impacted by the first blockage. In another example, the comparing includes determining a total additional time between the determined first routes and the determined second routes. In another example, the comparing includes determining a total additional distance between the determined first routes and the determined second routes.

DETAILED DESCRIPTION

Overview

Figure 1:
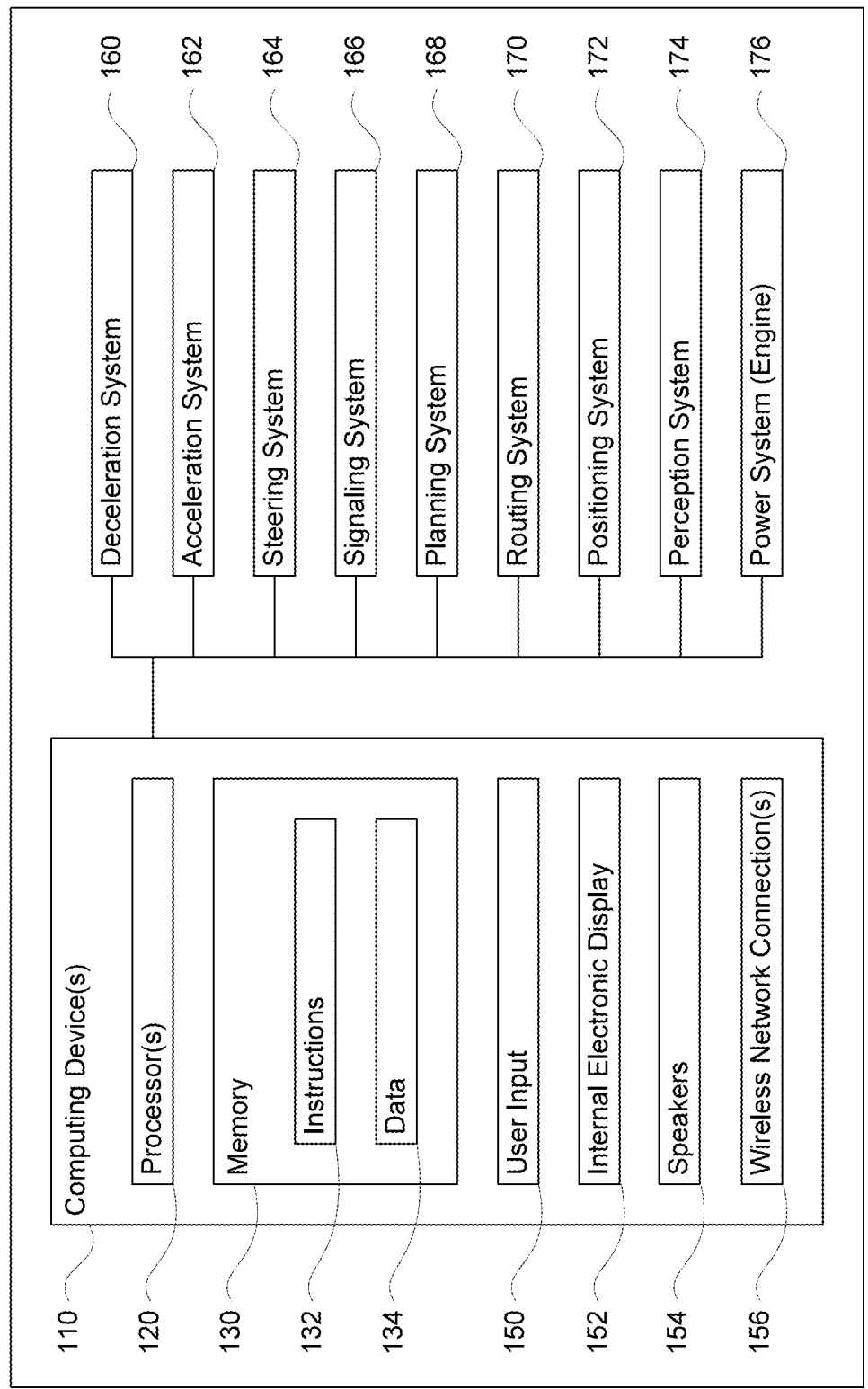
FIG. 1 is a functional diagram of an example vehicle in accordance with an exemplary embodiment.

The technology relates to assessing how blockages used for an autonomous vehicle transportation services affect trips made by vehicles of the service. A "blockage" may correspond to an area within a larger service area through which the vehicles are not permitted or able to drive. As such, blockages may be added to a vehicle's map information in order to prevent the vehicle from entering the area of the blockage. This may be for any number of reasons, including, for instance, high vehicular or pedestrian traffic areas, construction areas, areas that are not completely mapped, etc. In some instance, the blockages may be time based, for instance, a certain blockage may only apply for a particular period of time during the day, such as the area near a school when school is letting out. In order to assess the effects of blockages on trips made in the service area, a plurality of simulations may be run and compared to one another.

In order to do so, a plurality of starting and destination location pairs within the service area. In order to make an effective assessment, a large number of starting and destination location pairs may be required. These starting and destination location pairs may be determined from historical trips or by selecting points for the pairs.

In order to do the comparison, a baseline for the service, or rather, for the service area, may be established. In some instances, this baseline may include running a first set of simulations using the starring and destination location pairs without any blockages. Each simulation may then be "run" by determining a route for each a pair of starting and destination locations. This may involve inputting each pair of starting and destination locations into a routing system, or software stack, used by the autonomous vehicles. The routing system may determine an overall route between each starting location and destination location. For each of the routes, a summary may be generated. Each summary may be considered a "baseline summary" and may identify how long the route is expected to take, a length of the route, as well as the number of different types of maneuvers.

Once the baseline summaries are established, the same starting location and destination location pairs may be used to run a second set of simulations. However, when the second set of simulations are run, a blockage may be added to the service area. This may affect how the routing software routes the vehicles in the simulations. Again, summaries may be generated for each of the routes as described above.

In order to determine the effects of the blockages, the summaries for identical pairs of starting and destination locations may be compared with one another to determine a number of the routes that were affected by the added blockage. For any routes that are impacted, additional analysis may be made in order to determine details of the effects. The results of the additional analyses may be used to prioritize efforts for improving various aspects of the service.

The features described herein may be useful in assessing the impact of blockages on an autonomous vehicle transportation service. Not only can one determine how a blockage will affect a particular starting and destination location pair, but also how a blockage will affect the service overall in terms of impact to users of the service. The features described herein can also be used to prioritize efforts for improving various aspects of the service.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audiovisual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, and power system 176 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 172 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
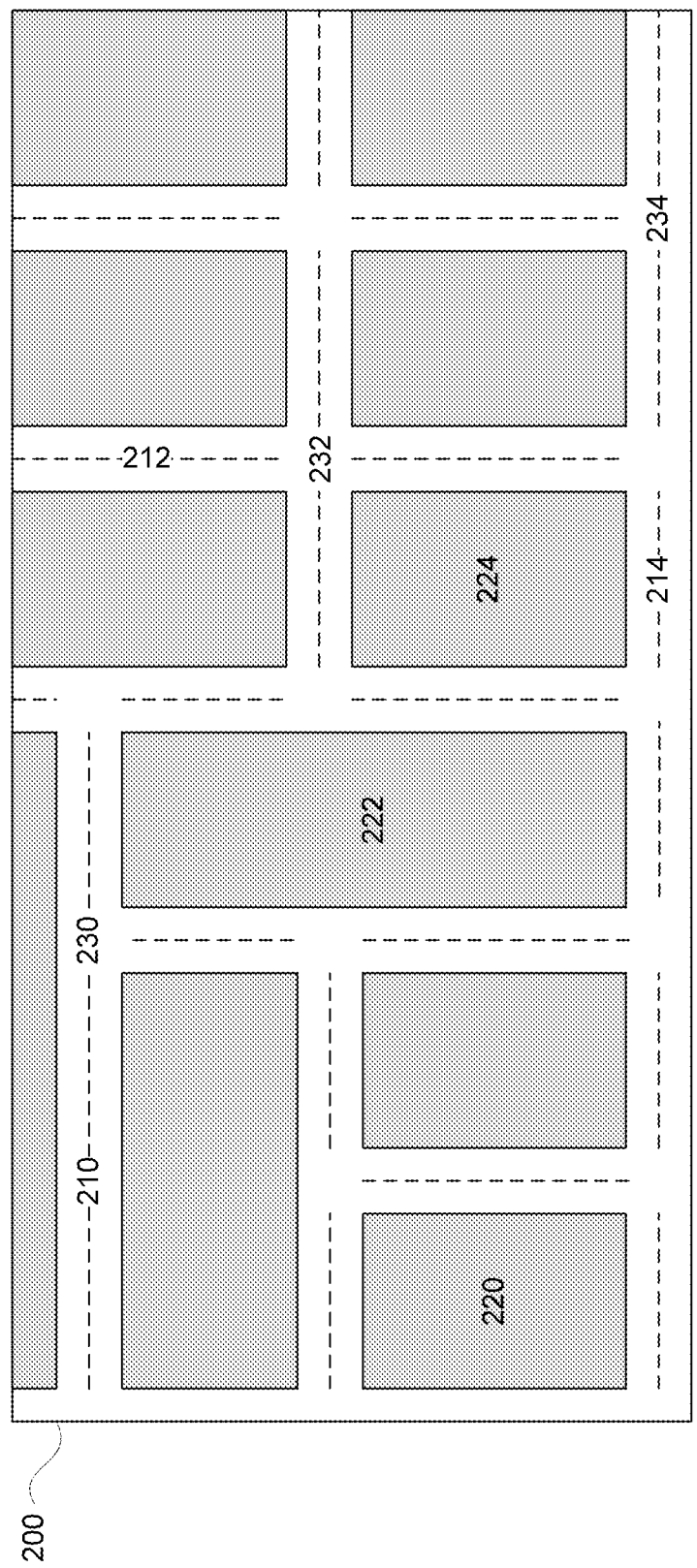
FIG. 2 is an example of map information in accordance with aspects of the disclosure.

FIG. 2 is an example of map information 200 for a section of roadway corresponding to a service area for autonomous vehicles such as vehicle 100. In this example, the map information 200 includes information identifying the shape, location, and other characteristics of lane lines represented by dashed-lines 210, 212, 214 designating roads or otherwise drivable areas, non-drivable areas (such as buildings, parks, etc.) represented by shaded areas 220, 222, 224, as well as intersections 230, 232, 234. Although only a few features are shown and identified, the map information 200 may be highly-detailed and include various additional features, including for instance the locations and boundaries of blockages as discussed further below. Although only few features are depicted in the map information 200 of FIG. 2, however, the map information 200 may include significantly more features and details in order to enable the vehicle 100 to be controlled in the autonomous driving mode.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
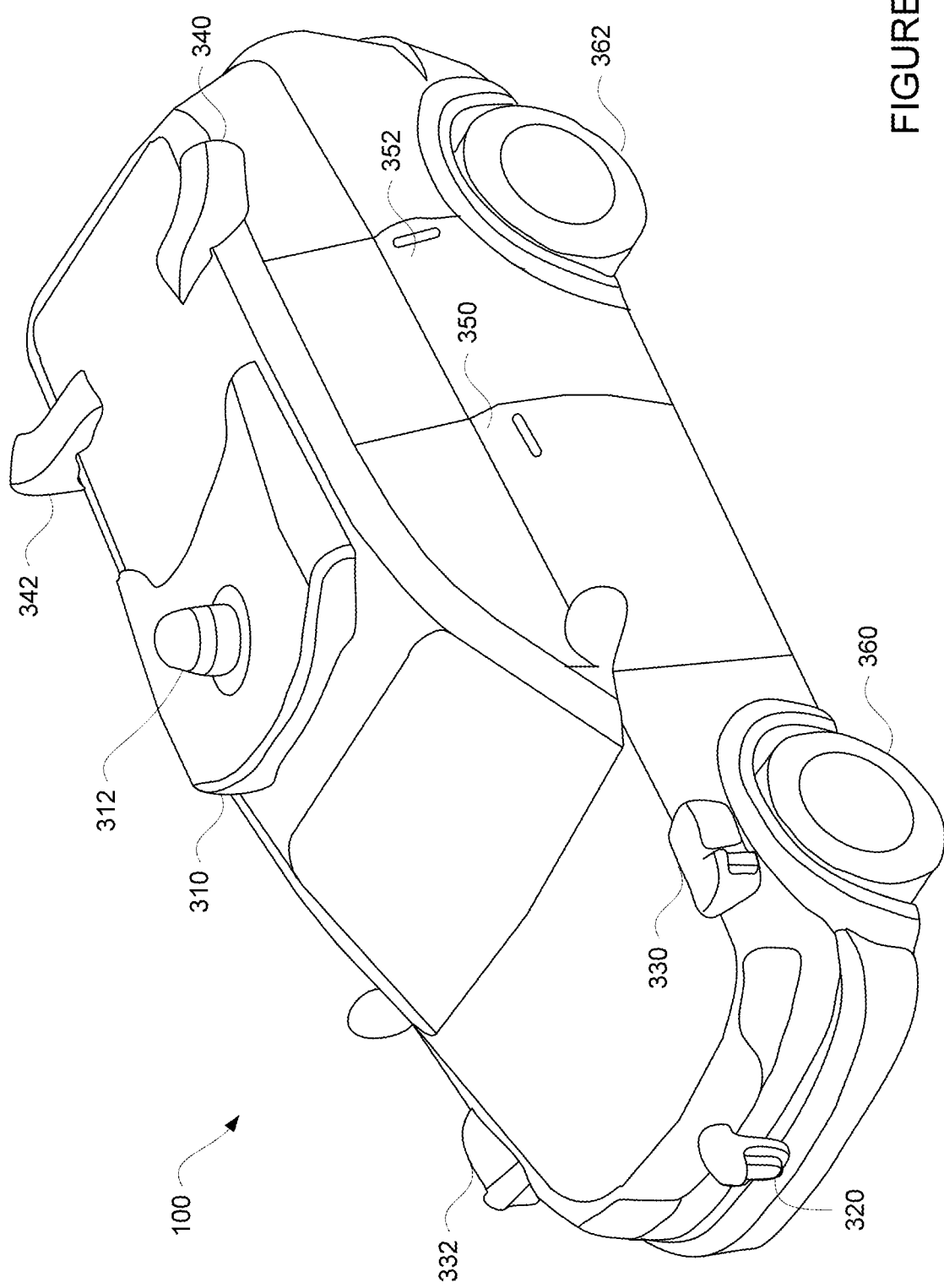
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
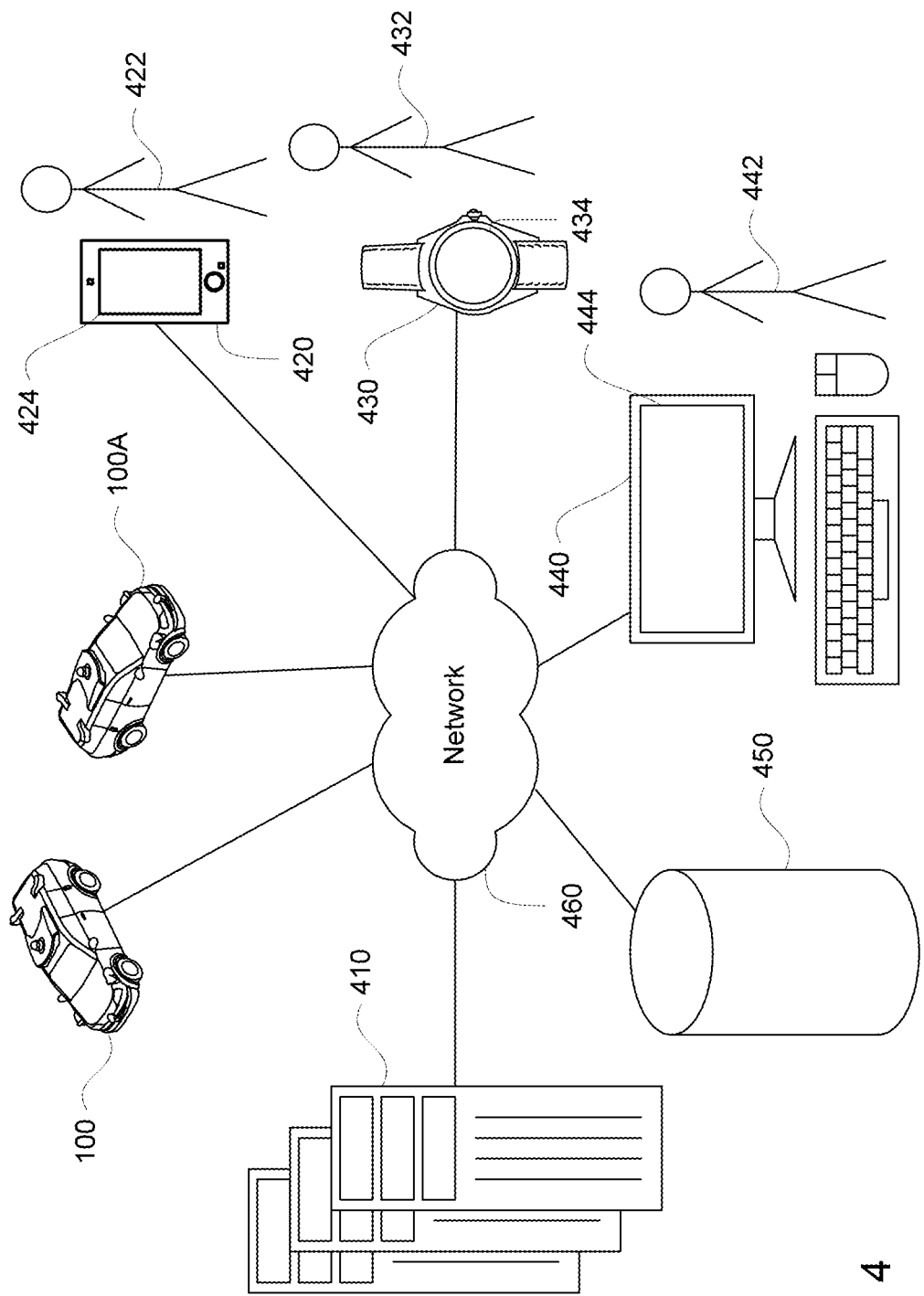
FIG. 4 is a pictorial diagram of an example system in accordance with aspects of the disclosure.
Figure 5:
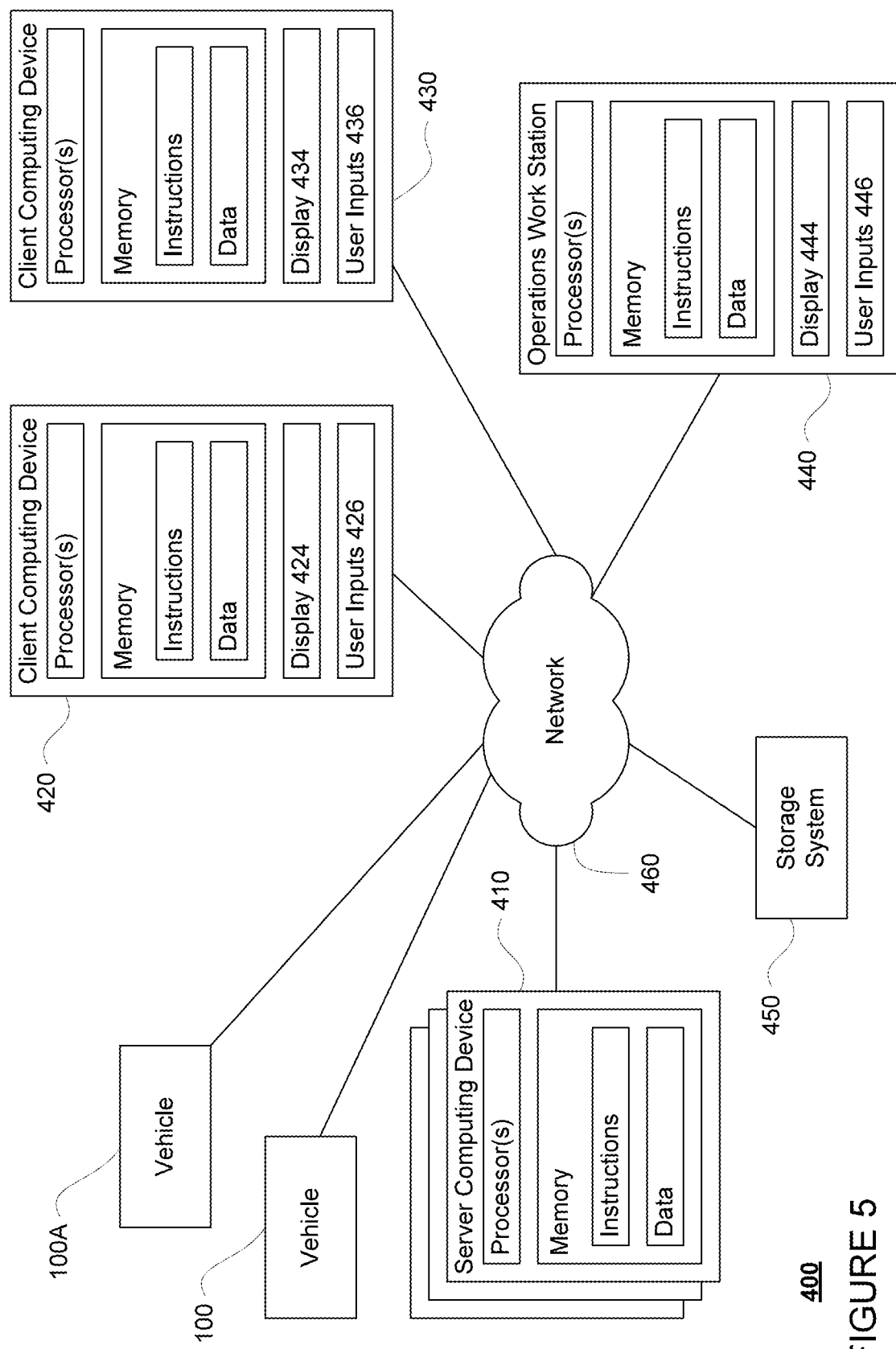
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicles 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example, the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store a version of map information 200, real time and/or historical traffic information (for instance, received from one or more live feed sources), as well as blockages, including locations, boundaries, areas, etc. as discussed further below.

The storage system 450 may also store a software stack or module for the aforementioned routing system 170 as well as historical trip information. The software module may be programmed in order to determine a route between two locations given the map information. The historical trips may include trips taken by users from the starting location where the user was picked up to a destination location where the user was dropped off within a previous period of time, such as within the last week or several weeks. Historical trips may also include trips taken by a vehicle from a starting location where the vehicle received instructions to pick up a passenger to a destination location where the vehicle picked up the passenger. Because many users will take the same trips, in some instances, this may result in repeated trips. Of course, each historical trip may also be associated with a time of day when the trip was started.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

The technology relates to assessing how blockages used for an autonomous vehicle transportation services affect trips made by vehicles of the service. A "blockage" may correspond to an area within a larger service area through which the vehicles are not permitted or able to drive. As such, blockages may be added to a vehicle's map information in order to prevent the vehicle from entering the area of the blockage. This may be for any number of reasons, including, for instance, high vehicular or pedestrian traffic areas, construction areas, areas that are not completely mapped, etc. In some instance, the blockages may be time based, for instance, a certain blockage may only apply for a particular period of time during the day, such as the area near a school when school is letting out. In order to assess the effects of blockages on trips made in the service area, a plurality of simulations may be run and compared to one another.

Figure 6:
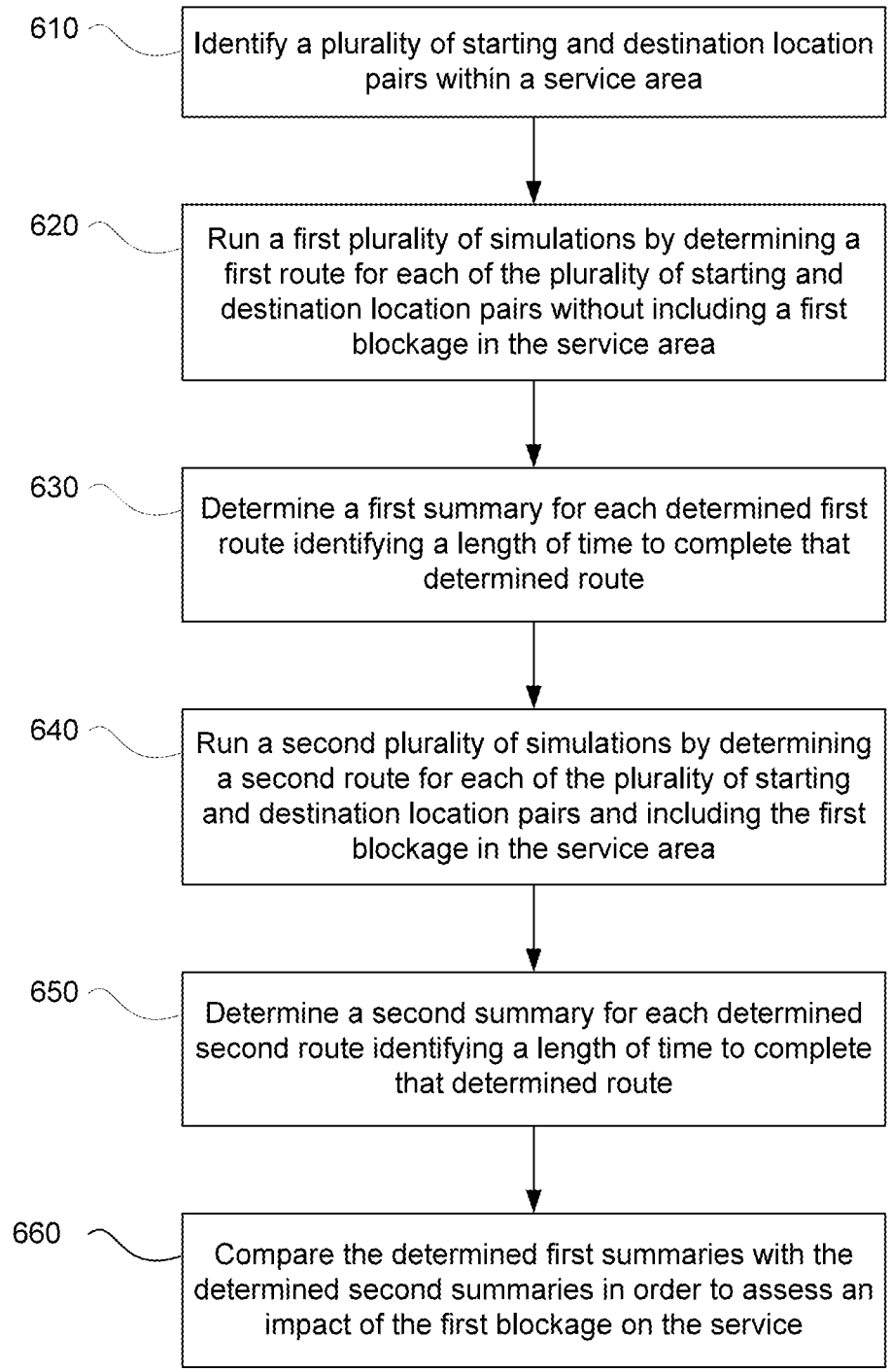
FIG. 6 is an example flow diagram in accordance with aspects of the disclosure.
Figure 7:
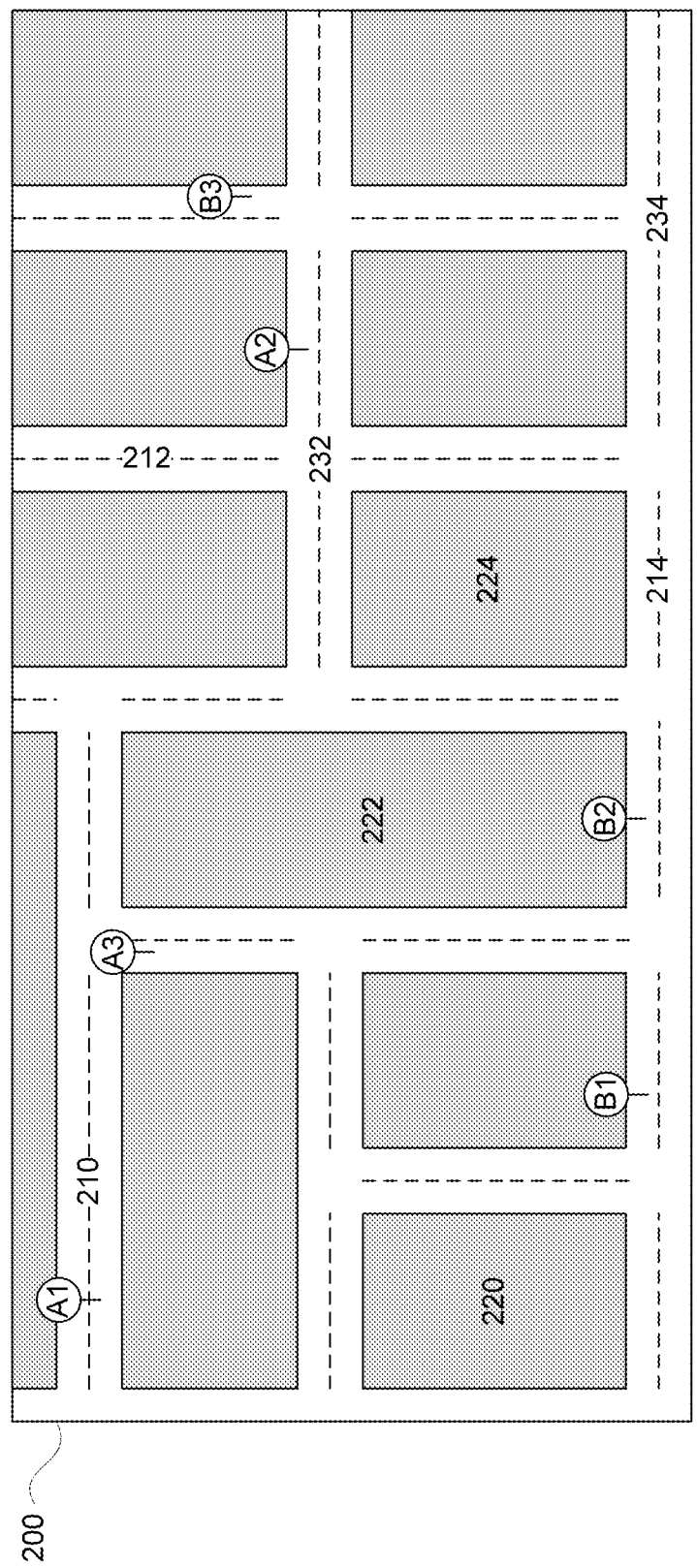
FIG. 7 is an example of map information and starting and destination locations in accordance with aspects of the disclosure.

FIG. 6 includes an example flow diagram 600 of some of the examples for assessing impact of blockages on an autonomous vehicle transportation service, which may be performed by one or more processors such as the processors of computing devices 410. For instance, at block 610, a plurality of starting and destination location pairs within a service area are identified. In order to make an effective assessment, a large number of starting and destination location pairs, for instance, on the order of 5,000 to 10,000 pairs, may be required. These starting and destination location pairs may be determined from the aforementioned historical trips or by selecting points for the pairs. For instance, FIG. 7 includes the map information 200 as well as a plurality of starting locations (A1, A2, A3) and a plurality of destination locations (B1, B2, B3). Although the starting and destination locations are depicted as different from one another, a starting location for one historical trip would very likely also be a destination location for an earlier historical trip. Returning to the example of FIG. 7, A1 and B1 may represent starting and destination locations, respectively, for a first historical trip, A2 and B2 may represent starting and destination locations, respectively, for a second historical trip, and A3 to B3 may represent starting and destination locations, respectively, for a third historical trip. As such, for an example, a plurality of starting and destination locations may include A1 and B1, A2 and B2, and A3 and B3.

In addition, or alternatively, different starting and destination locations may be randomly selected and paired with one another for the starting and destination location pairs. For instance, starting and destination locations may be randomly selected from the historical trips. As an example, A1 may be selected as a starting location and may be paired with B2, B3, A2, and/or A3 as a destination location.

As another instance, starting and destination location pairs may be selected by a fuzzing technique which may involve "fuzzing" prior starting and destination location pairs. As one example, starting and destination locations may be assigned to S2 cells (for instance, using the S2

Figure 8:
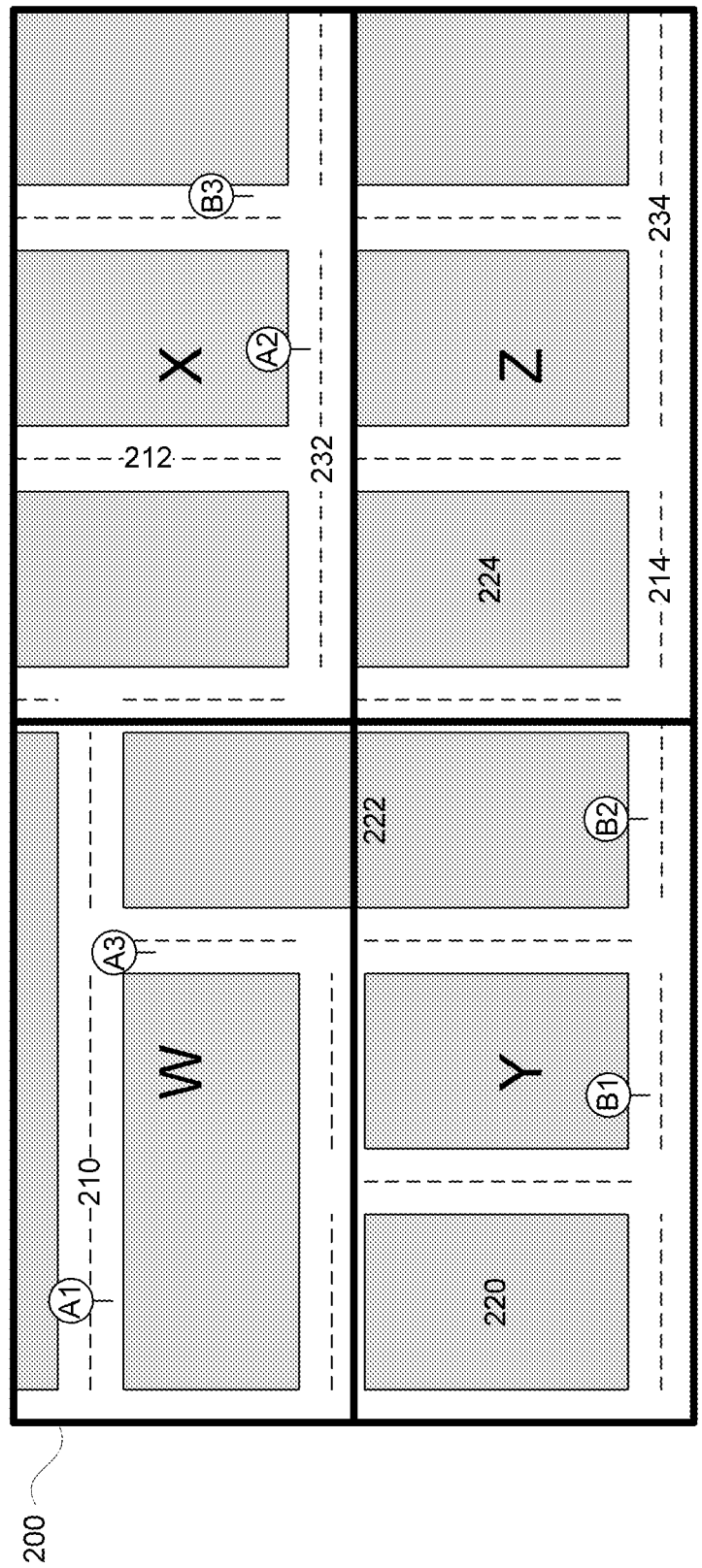
FIG. 8 is an example of map information, starting and destination locations, and cells in accordance with aspects of the disclosure.

Library for dividing a unit sphere into cells) at some particular level of granularity. Another location within the same S2 cell as the starting location may be selected as a fuzzed starting location, and another location within the same S2 cell as the destination location may be selected as a fuzzed destination location. The fuzzed starting and destination locations may then be paired as a starting and destination location pair. As an example, FIG. 8 represents the map information and starting and destination locations of FIG. 7 divided into four cells (W, X, Y and Z). In this example, A1 (in cell W) may be paired with B2 (in cell Y), A2 (in cell X) may be paired with B1 (in cell Y), and A3 (in cell W) may be paired with B3 (in cell X) as each of these starting and destination locations are within the same cell. Alternatively, any points or locations (which may or may not starting and destination locations) may be selected from different cells (for instance, randomly) and paired with one another. In either instance, the selection may identify new trips not taken by the vehicles or users. In addition, because these trips are not already associated with a time, each trip may be duplicated such that it occurs once during high traffic times (i.e. 5 pm rush hour) as well as very low traffic times (i.e. 1 am in the morning).

A baseline for the service, or rather, for the service area, may be established by using the plurality of starting and destination location pairs to run a first set of simulations. For instance, returning to FIG. 6, at block 620, a first plurality of simulations is run by determining a first route for each of the plurality of starting and destination location pairs without including a first blockage in the service area. In some instances, this baseline may include running a first set of simulations using the starring and destination location pairs without any blockages. Although in other instances, the baseline may also include one or more blockages. This may be necessary in situations where the blockages are considered long-term blockages (such as for long-term construction projects, unmapped areas, etc.).

Figure 9:
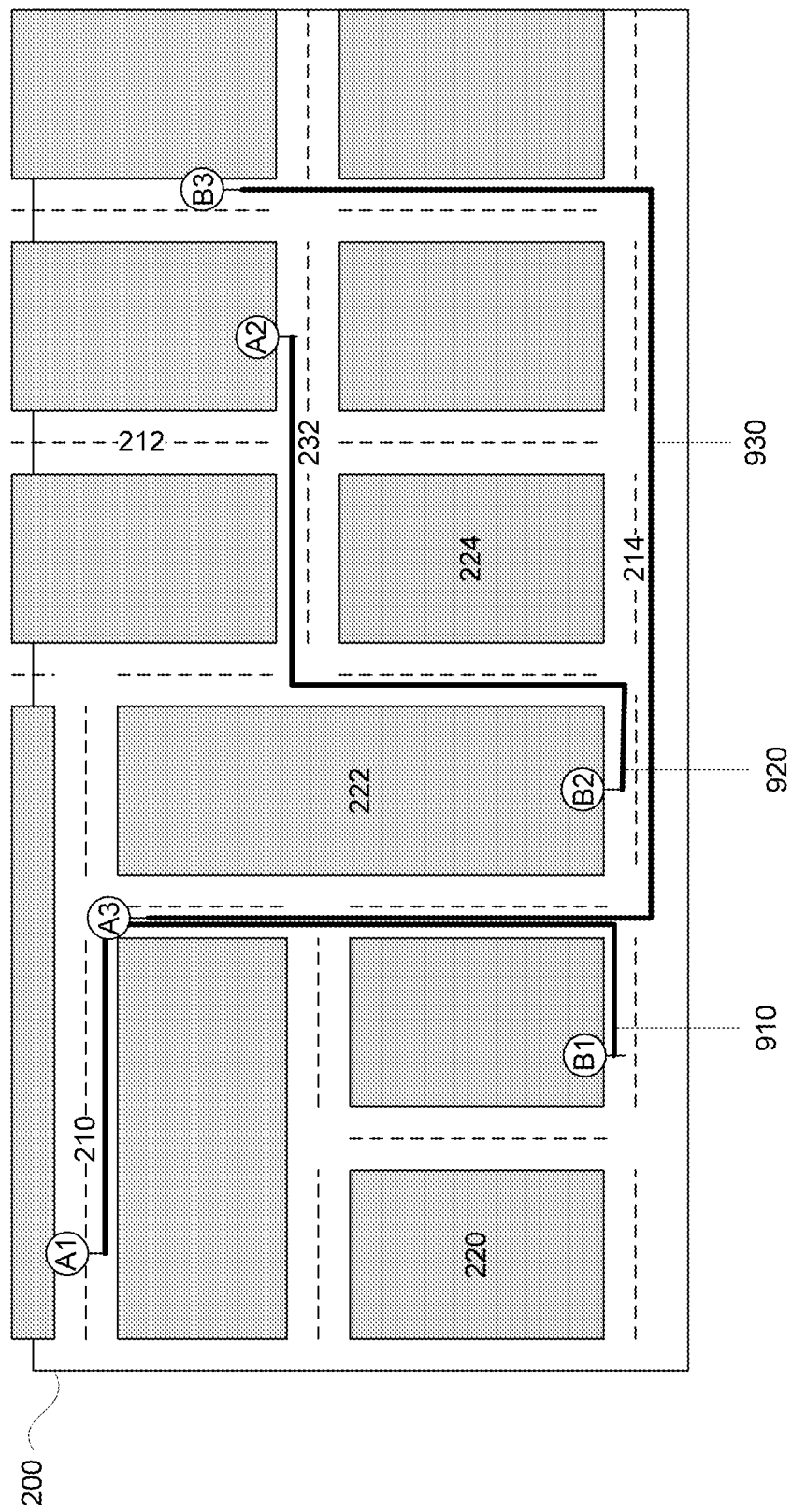
FIG. 9 is an example of map information, starting and destination locations, and routes in accordance with aspects of the disclosure.

Each simulation may then be "run" by determining a route for each a pair of starting and destination locations. This may involve inputting each pair of starting and destination locations into the software module for the routing system used by the autonomous vehicles (or rather, the version of that software module that may be stored in storage system 450). The software module of the routing system may determine an overall route between each starting location and destination location. As noted above, because each starting and destination location pair is associated with a time, the routing system may use this information, in combination with historical and real time traffic information in order to determine the routes. For instance, returning to the example above where the plurality of starting and destination locations includes A1 and B1, A2 and B2, and A3 and B3, FIG. 9 depicts the results of three simulations, or rather, route 910 between A1 and B1, route 920 between A2 and B2, and route 930 between A3 and B3.

Figure 10:
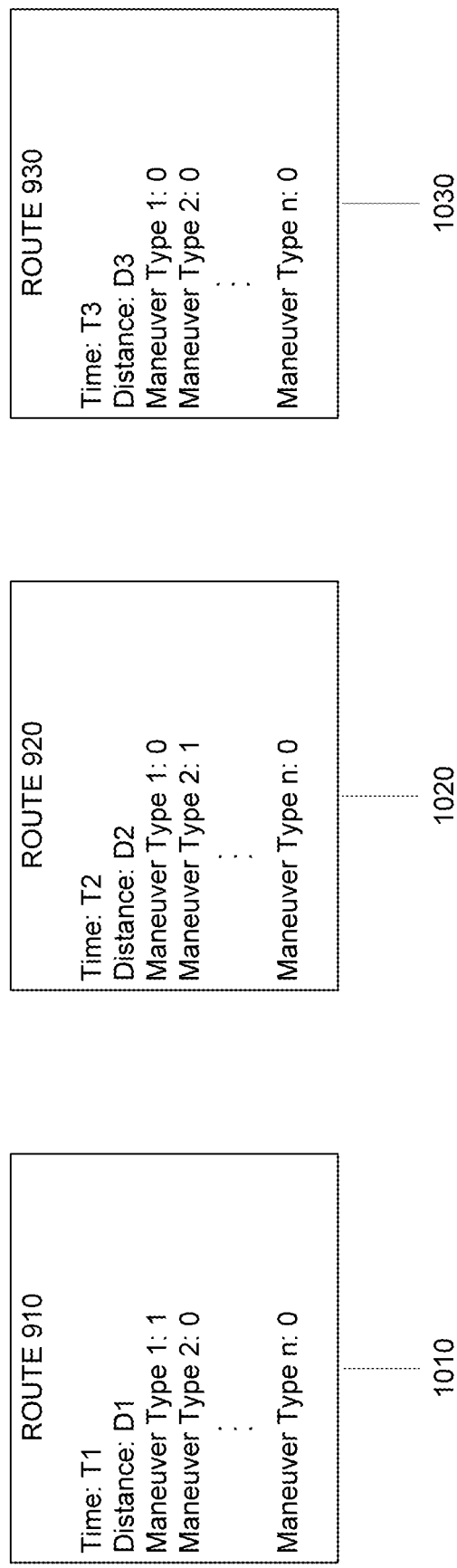
FIG. 10 is an example of summaries for routes in accordance with aspects of the disclosure.

For each of the routes, a summary may be generated. For instance, as shown in block 630 of FIG. 6, a first summary for each determined first route identifying a length of time to complete that determined route is determined. For example, each first summary may be a "baseline summary" and may identify how long the route is expected to take (in time), a length of the route (in distance), as well as the number of different types of maneuvers. These maneuvers may include, for instance, right and left turns, unprotected left turns, lane changes, blocking left turns (where there is no dedicated left turn lane and the vehicle must block traffic behind it in order to complete a left turn), etc. The summary may also include other information, such as a forward progress metric, which identifies how often along the route the vehicle is moving towards or rather in the direction of (for instance, "as the crow flies") the destination location. Thus, as shown in FIG. 10, each route 910, 920, 930 is associated with a summary 1010, 1020, 1030, respectively. Each summary identifies a time (T), a distance (D), and a set of maneuvers required by each route (from maneuver type 1 to maneuver type n).

Once the baseline summaries are established, the same starting location and destination location pairs may be used to run a second set of simulations. However, when the second set of simulations are run, a blockage may be added to the service area. This may affect how the routing software or the routing system 170 would route the vehicle 100 in the simulations. For instance, as shown in block 640 of FIG. 6, a second plurality of simulations are run by determining a second route for each of the plurality of starting and destination location pairs and including the first blockage in the service area.

Figure 11:
FIG. 11 is another example of map information, starting and destination locations, and routes in accordance with aspects of the disclosure.

For example, FIG. 11 depicts the map information 200 with a blockage defined by area 1100. This blockage effectively prevents the software stack of the routing system 170 from routing vehicles in the area 1100. Although the blockage defined by area 1100 is depicted as a rectangle, various other types of polygons with lesser or greater numbers of vertices and other shapes (for instance, those including curves, etc.) may be used for more complexly shaped blockages. FIG. 11 also depicts the results of three simulations with the blockage defined by area 1100, or rather, route 1110 between A1 and B1, route 1120 between A2 and B2, and route 1130 between A3 and B3.

Figure 12:
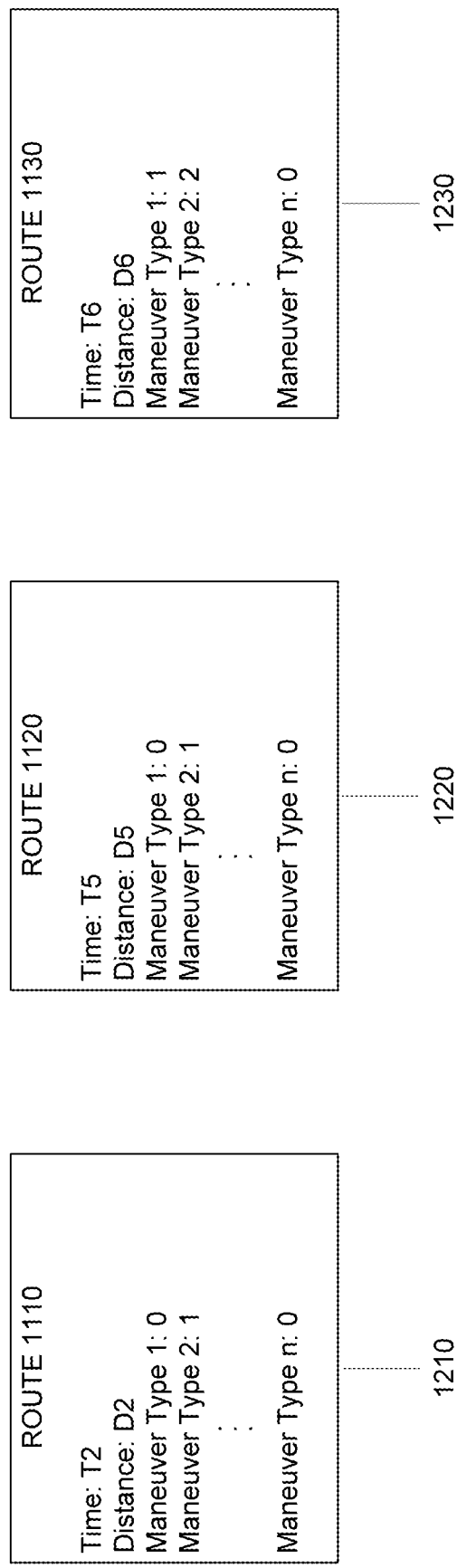
FIG. 12 is another example of summaries for routes in accordance with aspects of the disclosure.

Again, summaries may be generated for each of the routes as described above. For instance, as shown in block 650 of FIG. 6, a second summary for each determined second route identifying a length of time to complete that determined route is determined. As with the first summaries, each second summary may identify how long the route is expected to take (in time), a length of the route (in distance), as well as the number of different types of maneuvers. Again, these maneuvers may include, for instance, right and left turns, unprotected left turns, lane changes, blocking left turns (where there is no dedicated left turn lane and the vehicle must block traffic behind it in order to complete a left turn), etc. The summary may also include other information, such as a forward progress metric, which identifies how often the vehicle is moving in the direction of the destination location. Thus, as shown in FIG. 12, each route 1110, 1120, 1130 is associated with a summary 1210, 1220, 1230, respectively. Each summary identifies a time (T), a distance (D), and a set of maneuvers required by each route (from maneuver type 1 to maneuver type n).

In order to determine the effects of the blockages, for instance, as shown in block 660 of FIG. 6, the determined first summaries are compared with the determined second summaries in order to assess an impact of the first blockage on the service. For example, the summaries for identical pairs of starting and destination locations may be compared with one another to determine a number of the routes that were affected by the added blockage. For example, summary 1010 may be compared to summary 1210, summary 1020 may be compared to summary 1220, and summary 1030 maybe compared to summary 1230. As can be seen between FIGS. 9 and 11, routes 910 and 930 are affected by the blockage defined by area 1100 as routes 1110 and 1130 are different from routes 910 and 930, respectively, and route 920 is not affected by the blockage defined by area 1100 as routes 920 and 1120 are the same. The computing devices 410 may make this same determination by comparing the summaries. In this regard, summaries 1010 and 1210 as well as summaries 1030 and 1230 would be different from one another, while summaries 1020 and 1210 would be identical. In other words, the comparison may identify which starting and destination location pairs resulted in summaries which changed (in any way) between the first set of simulations and the second set of simulations. This number may be considered a proxy for the number of users who are likely to be impacted by the blockage.

For any routes that are impacted, additional analysis may be made in order to determine details of the effects. For instance, the total additional time, total additional distance, total additional maneuvers, etc. for all affected routes, here routes 910 and 930, may be determined. If the additional time is relatively little, then even though a large number of routes are affected, the blockage may have very little impact on the service. However, though this is true in the sense of time impact, many users might still find the fact that a blockage adds additional time to a route annoying or frustrating, so from a service perspective, if many user routes are impacted by a blockage analysis of that blockage might still be important. Similarly, if the additional time is relatively a lot, then even though a small number of routes are affected, the blockage may have very significant impact on the service. Another factor is the difference in types of maneuvers needed due to a blockage (these metrics are also important apart from time). For prioritization, blockages that impact very few routes and also have very little time impact (and impact on other maneuvers) may be considered the least important (i.e. to have very low priority) for analysis.

This process may be repeated by adding or removing blockages, running simulations, determining summaries, and comparing summaries as described above in order to determine the effect of each change on the service area. Of course, the more blockages included in the analysis, the number of values to process and compare increases. In this regard, it may be most useful to only simulate blockages that are close to one another or "related" during the same simulation. For instance, any set of blockages that impact the same route or routes may be considered "related" and may be tracked and stored over time such that when running future simulations, the blockages in the set can be analyzed (or rather included in the same simulations) together.

The results of the repetition of the process and the additional analyses may be used to prioritize efforts for improving various aspects of the service. For instance, before a blockage can be removed from the map information of a vehicle, the area of the blockage may need to be scouted or visited one or more times (for instance, at one or more times of day) in order to determine whether it is safe for the vehicles of the service to enter the blockage. In such cases, this work may thus be prioritized for blockages that have the most significant effects on the service. As another instance, some blockages may be added to the map information while the area of the blockages are being re-mapped (i.e. new data is being collected in order to update the map information for all vehicles). In such cases, these blockages may be broken up into smaller areas, each with lesser impact as determined by the comparing, in order to reduce the impact on the service. As another instance, some blockages may be added to the map information at locations where the vehicle would need to make a particular maneuver which may currently be risky, dangerous, or otherwise not properly vetted or tested. In such cases, where the blockage has a significant impact on the service, working on the features that enable the vehicles to make the particular maneuver may be prioritized over work on other features.

In addition, the running of the simulations is based on the software module of the routing system of the autonomous vehicles which is stored in the storage system 450. In this way, as the software module used by the server computing devices 410 (and/or stored in the storage system 450) is changed and/or updated, the results of the simulations may change. In this regard, the server computing devices are able to use the most up to date information about how the autonomous vehicles would route themselves with or without blockages in the map information and may even test the effects of new software versions before they are used on autonomous vehicles. In addition, new blockages and even hypothetical blockages may be tested as they are introduced into the map information. As an example, blockages may be placed at different locations in the map information and tested to see how such blockages impact routing and determine which locations are critical to maintaining good routing quality.

The features described herein may be useful in assessing the impact of blockages on an autonomous vehicle transportation service. Not only can one determine how a blockage will affect a particular starting and destination location pair, but also how a blockage will affect the service overall in terms of impact to users of the service. The features described herein can also be used to prioritize efforts for improving various aspects of the service as described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of assessing impact of blockages on an autonomous vehicle transportation service, the method comprising:
   identifying, by one or more processors of a computing device, a plurality of starting and destination location pairs within a service area;
   running, by the one or more processors, a first plurality of simulations by determining a first route for each of the plurality of starting and destination location pairs without including a first blockage in the service area;
   determining, by the one or more processors, a first summary for each determined first route identifying a length of time to complete that determined route;
   running, by the one or more processors, a second plurality of simulations by determining a second route for each of the plurality of starting and destination location pairs and including the first blockage in the service area;
   determining, by the one or more processors, a second summary for each determined second route identifying a length of time to complete that determined route; and comparing, by the one or more processors, the determined first summaries with the determined second summaries in order to assess an impact of the first blockage in the service area.

2. The method of claim 1, wherein the first blockage corresponds to an area through which a vehicle of the autonomous vehicle transportation service is not permitted to drive by the service area.

3. The method of claim 2, wherein the first blockage includes a timing component which identifies a particular period of time during which the first blockage is effective.

4. The method of claim 1, wherein identifying the plurality of starting and destination location pairs includes selecting prior trips made using the autonomous vehicle transportation service within a previous period of time.

5. The method of claim 1, wherein identifying the plurality of starting and destination location pairs includes selecting a starting location and a destination location from different prior trips made using the autonomous vehicle transportation service within a previous period of time.

6. The method of claim 5, further comprising assigning a time to the selected starting location and destination location corresponding to a high-volume traffic period.

7. The method of claim 5, further comprising assigning a time to the selected starting location and destination location corresponding to a low-volume traffic period.

8. The method of claim 1, wherein identifying the plurality of starting and destination location pairs includes selecting a starting location and a destination location using a prior starting and destination location pair.

9. The method of claim 1, wherein each starting and destination location pair of the plurality is associated with a time at which a corresponding route will start.

10. The method of claim 1, wherein each first summary for each determined first route includes a length of that first determined route, and each second summary for each determined second route includes a length of that second determined route.

11. The method of claim 1, wherein each first summary for each determined first route includes a number of a type of maneuver required by that first determined route, and each second summary for each determined second route includes a number of the type of maneuver required by that second determined route.

12. The method of claim 11, wherein the type of maneuver is an unprotected turn.

13. The method of claim 11, wherein the type of maneuver is a lane change.

14. The method of claim 11, wherein the type of maneuver is a blocking left turn.

15. The method of claim 1, wherein the comparing includes determining a difference between a number of a type of maneuver required by each of the determined first routes and a number of the type of maneuver required by each of the determined second routes.

16. The method of claim 1, wherein each first summary for each determined first route includes a forward progress metric identifying how often that determined first route progresses towards a destination location for that determined first route, and each second summary for each determined second route includes a forward progress metric identifying how often that determined second route progresses towards a destination location for that determined second route.

17. The method of claim 1, wherein running the first plurality of simulations includes a second blockage in the service area.

18. The method of claim 1, wherein the comparing includes determining a number of starting and destination location pairs impacted by the first blockage.

19. The method of claim 1, wherein the comparing includes determining a total additional time between the determined first routes and the determined second routes.

20. The method of claim 1, wherein the comparing includes determining a total additional distance between the determined first routes and the determined second routes.

* * * * *